United States Patent [19]

Jacobs et al.

[11] 3,808,381

[45] Apr. 30, 1974

[54] CONTINUITY TESTING CIRCUIT FOR TESTING TRANSMISSION PATHS

[75] Inventors: Melvin A. Jacobs, Hinsdale; Michael H. Shiu, Chicago, both of Ill.

[73] Assignee: GTE Automatic Electric Laboratories Incorporated, Northlake, Ill.

[22] Filed: Oct. 24, 1972

[21] Appl. No.: 299,961

[52] U.S. Cl. .................. 179/175.3 R, 179/175.2 R

[51] Int. Cl. .............................................. H04b 3/46

[58] Field of Search....... 179/175.3, 175.25, 175.23, 179/175.2 C, 175.2 R; 324/62 R, 51

[56] References Cited

UNITED STATES PATENTS

| | | | |
|---|---|---|---|
| 3,691,309 | 9/1972 | Gartner et al. | 179/175.2 C |
| 3,128,426 | 4/1964 | Swinehart | 324/62 R |
| 3,169,168 | 2/1965 | Capranica | 324/62 R |

*Primary Examiner*—William C. Cooper
*Assistant Examiner*—Douglas W. Olms
*Attorney, Agent, or Firm*—Robert J. Black

[57] ABSTRACT

A continuity testing circuit which operates in conjunction with a resistor bridged across a transmission path, to test the transmission path for open, short or grounded conditions, prior to the transmission path being used on a call. The resistor is located in the incoming trunk of four-wire systems, and in the outgoing trunk of two-wire systems.

7 Claims, 2 Drawing Figures

CONTINUITY TESTING CIRCUIT FOR TESTING TRANSMISSION PATHS

BACKGROUND OF THE INVENTION

This invention relates to an electronic continuity testing circuit for testing transmission paths through a switching matrix for open, short or grounded conditions.

In a common control electronic communication system, a marker selects, tests and connects an idle matrix path between the trunk of an incoming call to an outgoing trunk of the designated route. When this idle matrix path is established, the marker turns the call over to a register-sender, to complete the connection to a called party, to thereby establish a transmission path between the calling and called parties.

In many prior switching systems, electromechanical devices such as relays were used to determine whether a transmission path was open or closed. The use of these devices require −50 volts potential to be present in the switching network. In most present day switching systems such as the above generally described marker controlled common control system, the voice transmission paths are switched dry (no potential) to reduce potential noise on the transmission path and to reduce matrix correed contact problems. Accordingly, since the transmission path is free of any potential, other devices or circuitry are required to test these established transmission paths.

SUMMARY OF THE INVENTION

The present invention provides a continuity testing circuit which operates in conjunction with a resistor bridged across a transmission path, to test the transmission path for open, short or grounded conditions, prior to the transmission path being used on a call. The resistor is located in the incoming trunk of four-wire systems, and in the outgoing trunk of two-wire systems.

Accordingly, it is an object of the present invention to provide an electronic continuity testing circuit for testing transmission paths for open, short and grounded conditions, prior to the transmission paths being used on a call.

A further object is to provide such a continuity testing circuit which can be used with any space division, that is, step-by-step, relay, crossbar or reed-switch, switching network or matrix.

Other objects of the invention will in part be obvious and will in part appear hereinafter.

BRIEF DESCRIPTION OF THE DRAWING

For a fuller understanding of the nature and objects of the invention, reference should be had to the following detailed description taken in connection with the accompanying drawing, in which.

DESCRIPTION OF THE INVENTION

Figure 1:
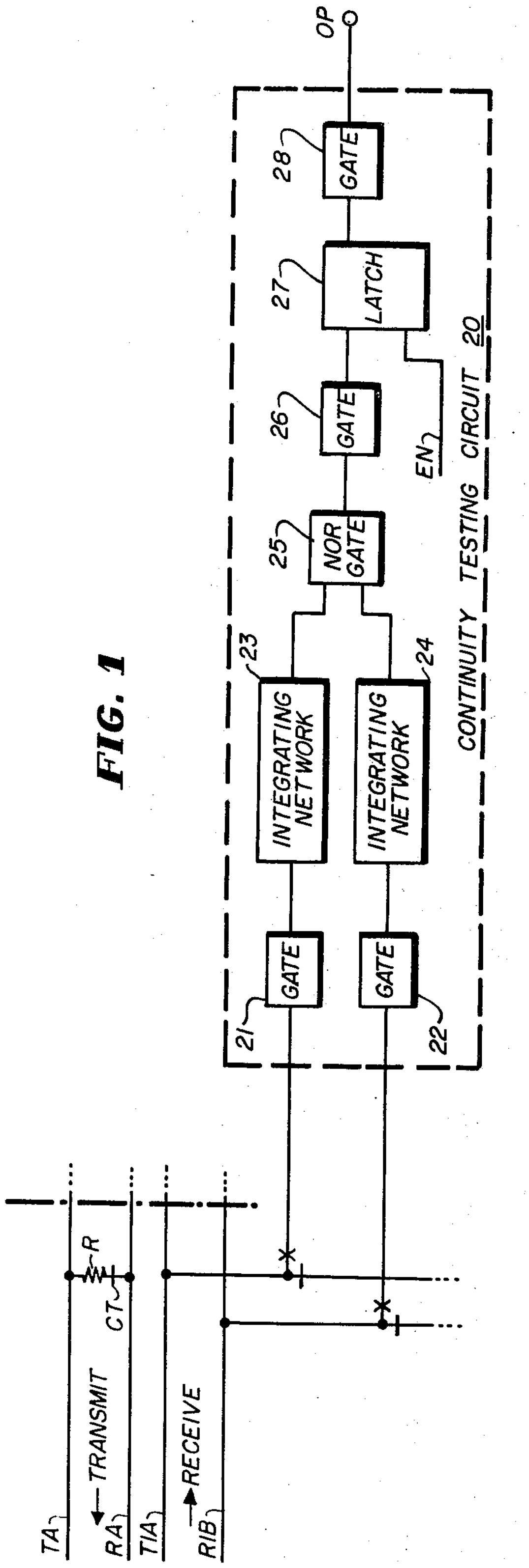
FIG. 1 is a block diagram schematic representation of the continuity testing circuit, within a switching system.

Referring now to the drawing, in FIG. 1 there is generally represented the incoming trunk 10 of a switching system, with the same being illustrated as a four-wire transmission path. While not shown, it will be appreciated that this incoming trunk 10 is connected to an outgoing trunk, by way of, for example, a trunk link frame, a junctor grouping frame and an office link frame, with the matrix path being established by a marker. After the marker has established this matrix path and prior to the marker turning the call over to a register-sender, the continuity testing circuit 20 is engaged by the marker to test the transmission path for shorts, open and grounded conditions.

The continuity testing circuit 20 operates in conjunction with a 600 ohm resistor R which is bridged across the wires TA and RA of the incoming trunk 10, in the illustrated four-wire system. In a two-wire system, this resistor R is bridged across the outgoing trunk. After the matrix path has been established and during a pre-established marker sequence state, the marker engages the continuity testing circuit 20, by providing an enabling signal EN to a latch 27, as described more fully below.

The continuity testing circuit 20 detects the continuity of the matrix path by sensing the presence of this 600 ohm resistor R. If the continuity of the transmission path is verified, an output signal OP is provided to cause the marker to turn the call over to a resister-sender, to complete the connection to a called party. If the continuity is not verified and a fault such as an open, a short or a ground condition exists, the output signal OP is such that the marker will not use the transmission path, will report the trouble, and then select another path.

Figure 2:
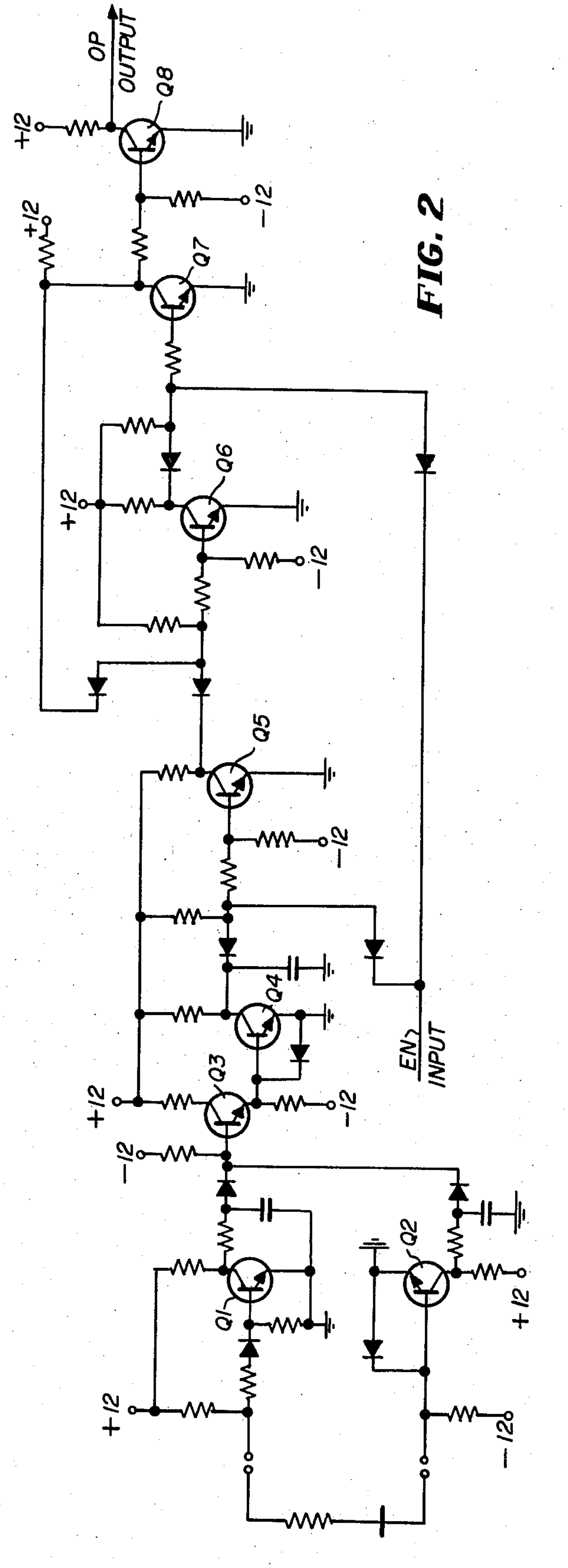
FIG. 2 is a schematic diagram of the continuity testing circuit.

Referring now to FIGS. 1 and 2, the continuity testing circuit 20 can be seen to include a pair of input gates 21 and 22, a pair of integrating networks 23 and 24, a NOR gate 25, a gate 26, a latch 27 and an output gate or inverter 28. Its operation can be described as follows.

In the idle condition, the input transistor Q1 (input gate 21) is biased ON and the input transistor Q2 (input gate 22) is biased OFF. When the transistors Q1 and Q2 are in these states, the output of the transistor Q4 (NOR gate 25) is "0." With the EN input to the transistor Q7 (latch 27) at "1," the output of the transistor Q7 is "1." The output OP of the transistor Q8 (output gate or inverter 28) is "0," under these conditions.

When the transmission path has been established by the marker, the resistor R connected across the wires TA and RA is effectively across the input to the transistors Q1 and Q2, the input to the continuity testing circuit 20. With the resistor R connected across the input to the continuity testing circuit, the input transistor Q1 is biased ON and the input transistor Q2 now also is biased ON. After an interval of time determined by the integrating network 24 (the resistor R6 and the capacitor C2), the transistor Q4 (NOR gate 25) is turned OFF. The integrating networks 23 and 24 merely provide a delay to prevent noise from effecting the operation of the circuit. The EN input normally is at "0" and, under these conditions, the output OP of the transistor Q8 (output gate or inverter 28) likewise is at "0."

During a pre-established marker sequence state after the transmission path has been established, the marker engages the continuity testing circuit 20 by placing an enabling signal on the EN input, causing the EN input to go to "1." With the EN input at "1," if there are no fault conditions in the established transmission path, the output of the transistor Q7 (latch 27) goes to "0" and the output OP of the transistor Q8 (output gate or inverter 28) goes to "1." The output OP at "1" is an indication to the marker that the transmission path has been verified, and the marker will turn the call over to a register-sender to complete the connection.

Fault conditions such as open circuits, or short circuits across the resistors R, or a short circuit to ground on any input will produce an output OP of "0," when the marker places the enabling signal on the EN input, to engage the continuity testing circuit. If a "0" output OP is indicated tothe marker, the marker will not use the transmission path, will report the trouble condition, and then select another transmission path. The latter then is tested, in the same described fashion.

More particularly, as indicated above, during idle conditions, the input transistor Q1 is biased ON and the input transistor Q2 is biased OFF. Under these conditions, the transistor Q3 is biased ON and the transistor Q4 (NOR gate 25) is biased ON, providing a "0" or grounded output. Transistor Q5 is biased OFF and the transistor Q6 (gate 26) is biased ON, providing a "0" output to the transistor Q7 (latch 27). At this time, the input to the transistor Q7 is held at "0" by the "0" normally applied to the EN input, so that the "0" output from the transistor Q6 to the transistor Q7 has no effect on the output of the transistor Q7. The transistor Q7 remains OFF, providing a "1" output (that is, an output at some potential above ground) to the transistor Q8 and thus biasing it conductive or ON. When the transistor Q8 (gate 28) is ON, the OP output is at "0."

When the transmission path has been established by the marker, the resistor R connected across the wires TA and RA is effectively across the input to the transistors Q1 and Q2, the input to the continuity testing circuit 20. At this time, several conditions may exist, namely:

1. Only input transistor Q1 is turned ON.
2. Only input transistor Q2 is turned ON.
3. Both the input transistors Q1 and Q2 are turned ON.

Condition (1) above indicates that the transmission path is open for the biasing networks for the input transistors Q1 and Q2 are established such that the input transistor Q2 is biased ON, if there is current flow through the resistor R1 and the transmission path. Condition (1) above also indicates a short circuit to ground, for such a condition always prevents the input transistor Q2 from being biased ON. Condition (2) above indicates a short circuit across the resistor R, since such a short circuit will upset the biasing network for the input transistor Q1 such that it is biased OFF, but the input transistor Q2 is biased OFF. Condition (3) above indicates that there is current flow through the resistor R1 and the transmission path, for the biasing networks for the input transistor Q1 and Q2 now are operative to turn ON both of them.

With only transistor Q1 conductive, or turned ON, as during condition (1) above, the makeup of the circuit is the same as it is during idle conditions, as described above. Transistor Q7 (latch 27) is held nonconductive, or OFF, by both the "0" output to it from the transistor Q6 (gate 26) and by the "0" normally applied to the EN input. When this EN input goes to "1," as described above when the marker places an enabling signal on it, the transistor Q7 still is held nonconductive by the "0" output of the transistor Q6 so that the transistor Q8 remains conductive, or ON, and the OP output is a "0". The marker therefore will not use this transmission path.

With only transistor Q2 conductive, or turned ON, as during condition (2) above, the operation is as described above, for the transistor Q3 remains conductive, or ON, and therefore cannot trigger or bias the transistor Q4 (NOR gate 24) non-conductive. The output on the OP output therefore remains a "0", and the marker will not use this transmission path.

With both transistor Q1 and Q2 conductive, or turned ON, as during condition (3) above, the transistor Q3 is biased nonconductive, or OFF. This action, in turn, biases the transistor Q4 (NOR gate 25) nonconductive, or OFF. The transistor Q5 then is biased ON and the transistor Q6 is biased OFF, providing a "1" output to the input of transistor Q7 (latch 27). This normally would turn ON transistor Q7, however, the "0" signal normally applied to the EN input holds transistor Q7 non-conductive, or OFF. Now, however, when the marker places an enabling signal, a "1" signal, on the EN input, transistor Q7 is turned ON and, in turn, causes the transistor Q8 to turn OFF. With the transistor Q8 turned OFF, the OP output goes to a "1", thus indicating to the marker that the transmission path has been verified.

From the above description, it can be seen that when the transmission path has been established and the resistor R1 is effectively connected across the inputs to the transistors Q1 and Q2, that one or both of these transistors will be conductive, or turned ON, depending upon the status of the transmission path. If only one of them is turned ON, the transistor Q4 (NOR gate 25) remains turned ON, with the result being that the transistor Q7 (latch 27) remains nonconductive, or turned OFF. The transistor Q8 (gate 28) therefore is conductive, or turned ON, and the OP output is a "0". It is only when both transistors Q1 and Q2 are turned ON, that the transistor Q4 is turned OFF. When transistor Q4 is OFF, the transistor Q7 (latch 27) is prepared to be turned ON, by the signal on the EN input lead.

It will thus be seen that the objects set forth above among those made apparent from the preceding description, are efficiently attained and certain changes may be made in carrying out the above method and in the construction set forth. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. In a common control communication system including a marker for establishing a transmission path between a trunk of an incoming call to an outgoing trunk through a switching network, a continuity testing circuit engageable by said marker and operable in conjunction with resistance means coupled across a pair of wires of said transmission path to test for open, short or grounded conditions prior to using the transmission path for a call, said circuit comprising a NOR gate, a first and a second input gate coupled to said NOR gate, latch means coupled to the output of said NOR gate and being provided with an enabling input from said marker, said first input gate normally being operative when said circuit is in an idle condition to enable said NOR gate to provide an input to said latch means, said latch means being operated upon the coincidence of said enabling input from said marker and said input from said NOR gate to provide a first output signal to said marker, said resistance means being coupled across said first and second input gates when said transmission path is established and operating said second input gate to disable said NOR gate, said latch means when said NOR gate is disabled being operated by said enabling input from said marker to provide a signal to said marker verifying the continuity of said transmission path.

2. The common control communication system of claim 1, wherein an open circuit, a short circuit across said resistance means, and a short circuit to ground on any input to said circuit when said resistance means is coupled across said first and second input gates operate one of said first and second input gates to enable said NOR gate to provide said input to said latch means, whereby said latch means is operated upon the coincidence of said enabling input from said marker and said input from said NOR gate to provide said first output signal to said marker, said first output signal to said marker indicating a fault condition in said transmission path.

3. The communication system of claim 2, wherein said resistance means is coupled across a pair of wires of said transmission path in the incoming trunk circuit of a four-wire system.

4. The communication system of claim 2, wherein said resistance means is coupled across a pair of wires of said transmission path in the outgoing trunk circuit of a two-wire system.

5. The communication system of claim 2, wherein said circuit further includes inverter means coupled to the output of said latch means for providing inverted output signals to said marker.

6. The communication system of claim 2, further including a first and a second integrating network coupled respectively to the outputs of said first and second input gates and to the inputs of said NOR gate.

7. The common control communication system of claim 2, wherein both said first and second input gates are operated when said resistance means is coupled across said first and second input gates and no fault conditions exist in said transmission path, said first and second input gates on being operated disabling said NOR gate to provide said input to said latch means, whereby said latch means is operated upon the coincidence of said enabling input from said marker and the absence of said input from said NOR gate to provide said signal to said marker verifying the continuity of said transmission path.

* * * * *